J. McKECHNIE AND T. FENDER.
BROACHING AND SURFACE FINISHING OF HOLES OR THE LIKE.
APPLICATION FILED NOV. 7, 1919.
1,425,122. Patented Aug. 8, 1922.
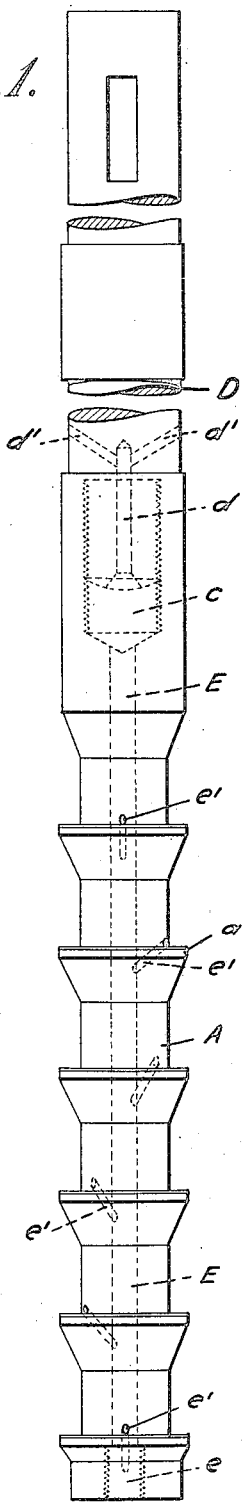
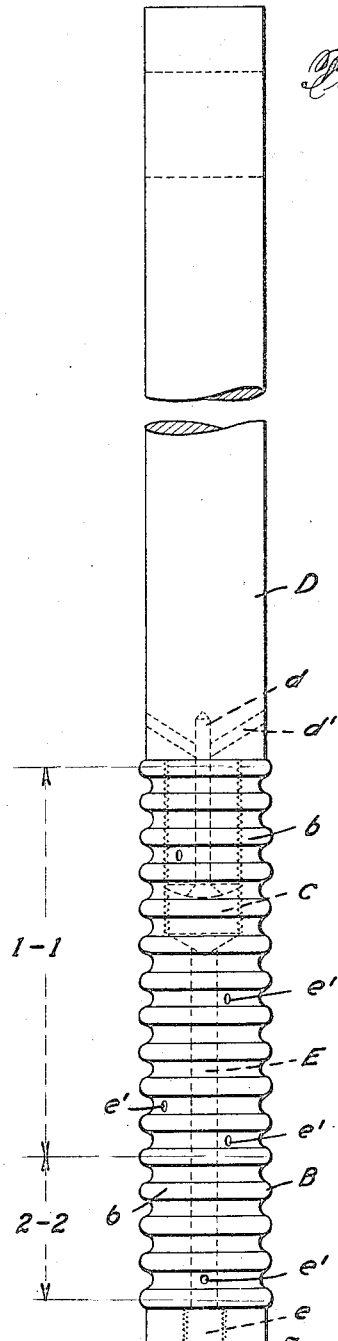
Inventor
James McKechnie
Thomas Fender
By Attorney

UNITED STATES PATENT OFFICE.

JAMES McKECHNIE AND THOMAS FENDER, OF WESTMINSTER, LONDON, ENGLAND, ASSIGNORS TO VICKERS LIMITED, OF WESTMINSTER, LONDON, ENGLAND.

BROACHING AND SURFACE FINISHING OF HOLES OR THE LIKE.

1,425,122.      Specification of Letters Patent.      Patented Aug. 8, 1922.

Application filed November 7, 1919. Serial No. 336,428.

*To all whom it may concern:*

Be it known that we, Sir JAMES McKECHNIE and THOMAS FENDER, both subjects of the King of Great Britain, residing at Vickers House, Broadway, Westminster, in the county of London, England, have invented certain new and useful Improvements in or Relating to the Broaching and Surface Finishing of Holes or the like, of which the following is a specification.

The present invention relates to the broaching and surface finishing of holes and the main object of the said invention is to extend the field for use of broaching operations by enabling comparatively long holes or the like, such for instance as the air recuperating cylinders of field guns, to be broached in a practicable and efficient manner and another object is to effect the surface finishing of the holes or the like in a more economical manner than heretofore.

For enlarging and trueing holes, broaching is a more economical operation than boring, the broaches used having a number of circular operative projections (usually, and hereinafter, referred to as teeth) spaced apart and successively increasing slightly in diameter in an axial direction opposite to the direction in which the broach is pulled through the hole. Heretofore such broaching operation has been effected by use of a single broach, the difference of diameter of the two operative ends of which has been about equal to the increase of diameter to be given to the hole or the like, by the entire broaching operation. It has therefore heretofore not been feasible to broach comparatively long holes up to say six feet long, because the amount of metal to be removed or dealt with by the entire broaching operation is always such that in order to distribute the whole of the broaching work over one broach, the length of the broach would have to be too great (say for instance thirty inches to four feet or more) to enable it to be hardened properly without objectionably changing its form and the power required to operate such a broach would be beyond the limits of a broaching machine of any practicable or economical dimensions; moreover, these impediments are accentuated as the diameter of the hole or the like is greater.

According to the present invention holes or the like are broached by the use in succession of a series of comparatively short broaches, that is, broaches of practicable operative length used successively one after the other instead of using one long broach for the complete broaching operation. The first broach would be passed entirely through the hole and remove or deal with a certain proportion of the total amount of the metal to be removed or dealt with by the broaching operation, the next broach of the series used would be of such dimensions as similarly to deal with a further proportion of the metal, its smaller diameter being about equal to the largest diameter of the first broach used, the third broach used of the series would similarly deal with a further proportion of the metal and have its smallest diameter about equal to the largest diameter of the broach previously used and so on. A further feature of the invention is that the last comparatively short broach of the series used operates or is adapted to operate as a burnisher, whereby a glass like finish is imparted to the surface of the hole or the like without the employment of a lapping operation as heretofore, which is very lengthy and costly. It is preferred that the broaching operation should be carried out by use of the broaching machine described and claimed in the specification of the application for British Patent No. 21282 of 1918.

In order that the said invention may be clearly understood and readily carried into effect the same will now be described more fully with reference to the accompanying drawing, in which:—

Figure 1 illustrates one of a series of short length broaches more particularly intended for use in broaching the recuperator of an 18 pounder gun and Figure 2 is the burnishing broach or tool for imparting a glass like finish to the hole, the broach and the burnishing tool being shown half full size.

A is the broach and B is the burnisher each being provided with a screw threaded opening C, at one end thereof, within which the reduced and screw threaded end $d$ of the broach bar D is adapted to be located. $a, a$ are the broach teeth and $b, b$ are the burnisher teeth. A water or other lubricating service is provided through the broach and also the burnisher which service comprises a central axial duct E which extends from end to end of each of the tools and is closed at one extremity by a plug $e$ and branch passages $e'$, $e'$ therefrom, which in the case of the broach A open at the peripheral surface thereof at points in front of each of the teeth $a$, $a$. In the example shown the branch passages $e'$, $e'$ are disposed in a helical line along the broach. A short axial duct $d$ and branch passages $d'$ are also provided in the bar D.

Where the diameter of the hole or the like is to be increased by say about .0175 of an inch, it is convenient to use a series of three comparatively short broaches such as shown at Figure 1 and a burnisher such as shown at Figure 2 so that when the entire broaching operation has been completed, the hole or the like has a glass like surface finish. Each of the three short broaches A may conveniently have six of the aforesaid teeth successively increasing in size by .001 of an inch from the most forward one to the most rearward one, the smallest diameter of the teeth on the second and third broaches being about equal to the largest diameter of the first and second broaches respectively as previously described. The final burnishing broach may conveniently comprise a comparatively large number of teeth having peripheries which as shown are each radially curved in cross section from a point in a plane in the middle of each tooth, the said teeth progressively increasing in diameter between the points 1—1 from the forward end very slightly and less than in the case of the teeth of the short broaches previously used, the most forward tooth being slightly less than the most rearward tooth of the last broach previously used. The last few teeth of the burnishing broach B between the points 2—2 are of the same diameter as one another, which diameter will be that of the completed and glass finished hole or the like.

Although the method of broaching has been more particularly described for use in a case where the removal of only a small amount of metal is required, the method is equally applicable to cases in which a large amount is to be removed it being understood that the larger the amount of metal to be removed the greater the number of broaches employed.

By the present invention, the field of broaching operations is considerably extended and it has been found by experiment that holes or the like of over two inches diameter and six feet in length or more may be successfully broached in a broaching machine of ordinary dimensions, by the use of a surprisingly small amount of power, very expeditiously and without any adverse effect upon the broaches themselves; and moreover the holes or the like completed are very true. The continual re-grinding and re-setting of boring tools for use in completing long holes as heretofore are therefore obviated and difficulties encountered in rough boring owing, for instance, to specially hard parts in the metal, are successfully overcome by broaching, and the hole or the like and its finish produced as aforesaid by broaching is superior to one completed by boring and lapping as usual unless quite an excessive amount of time and skill are exercised in such boring and lapping operations.

What we claim and desire to secure by Letters Patent of the United States is:—

A method of opening and burnishing comparatively long holes or the like (i. e. holes from two to six feet long or more) as an alternative to the usual method of boring and surface lapping, which consists in using in succession a series of broaches which are relatively short compared with the length of the hole which is to be bored, the first of the series being passed entirely through the hole so as to remove or deal with a certain proportion of the total amount of the metal, the second broach of the series being of such dimensions as to remove or deal with a further proportion of the metal and having its smallest diameter about equal to the largest diameter of the first broach used, the third broach of the series being of such dimensions as to remove or deal with a further proportion of the metal and having its smallest diameter about equal to the largest diameter of the broach previously used, and so on with any further broaches of the series that may be used until the hole or the like has been increased to the desired dimensions, and thereafter in using a broach having a comparatively large number of teeth which is adapted to operate as a burnisher, the diameter of the most forward tooth being of slightly less diameter than that of the most rearward tooth of the broach previously used and the last few teeth thereof being of the same diameter as each other.

JAMES McKECHNIE.
THOMAS FENDER.